United States Patent [19]
Kobo et al.

[11] Patent Number: 5,353,069
[45] Date of Patent: Oct. 4, 1994

[54] TRANSMITTED TELEVISION SIGNAL WAVEFORM EQUALIZING SYSTEM

[75] Inventors: Kazuo Kobo, Sakai; Kazuya Uyeda, Suita; Robert Ho, Osaka; Takashi Yamaguchi, Ibaraki, all of Japan

[73] Assignee: Matsushita Electric Industrial Co Ltd, Osaka, Japan

[21] Appl. No.: 59,266

[22] Filed: May 11, 1993

[30] Foreign Application Priority Data

May 14, 1992 [JP] Japan .................. 4-121624
May 14, 1992 [JP] Japan .................. 4-121679

[51] Int. Cl.⁵ .......................................... H04N 5/213
[52] U.S. Cl. ..................... 348/611; 348/614
[58] Field of Search ............... 358/166, 167, 36, 37, 358/405, 21 V, 142, 147, 149, 158; 348/614, 611, 473, 183, 478, 510, 537; H04N 5/213

[56] References Cited

U.S. PATENT DOCUMENTS

| | | | |
|---|---|---|---|
| 4,691,226 | 9/1987 | Freyberger | 358/158 |
| 4,896,213 | 1/1990 | Kobo et al. | 358/167 |
| 5,099,328 | 3/1992 | Kobo et al. | 358/167 |

Primary Examiner—James J. Groody
Assistant Examiner—Sherrie Hsia
Attorney, Agent, or Firm—Wenderoth, Lind & Ponack

[57] ABSTRACT

A waveform equalizing system includes: a clock reproducing phase locked loop circuit for reproducing a clock signal from a television signal; a transversal filter; a first selector circuit for alternatively passing the television signal or an output of a first memory to the transversal filter; a CPU for extracting reference signals contained in the television signal from the input and output of the transversal filter through two second memories respectively and for performing a synchronous addition of the same; the first memory for storing a reference signal processed by the synchronous addition; and a second selector circuit for alternatively delivering the television signal or an output of the transversal filter in response to a control signal from the CPU. The CPU is arranged for calculating a phase difference between the clock signal of the clock reproducing circuit and its ideal form from the reference signal processed by the synchronous addition and controlling a clock signal phase of the clock reproducing phase locked loop circuit to correct the phase difference.

5 Claims, 7 Drawing Sheets

TRANSMITTED TELEVISION SIGNAL WAVEFORM EQUALIZING SYSTEM

BACKGROUND OF THE INVENTION

1. Field of the Invention

The present invention relates to a waveform equalizing system for waveform equalizing a television signal transmitted in the form of a series of sampled values.

2. Description of the Prior Art

High definition television signals contain greater amounts of information than the conventional television signals of the existing TV systems and have to be compressed to an acceptable bandwidth for effective transmission. One of the known bandwidth compressing methods is a subsampling technique such as the Japanese MUSE (multiple sub-Nyquist sampling encoding) system. The MUSE system performs sampling of a television signal at 16.2 MHz to produce a sampled analog signal which is then transmitted, as compared with direct transmission of an original analog television signal in the existing TV system. Having been transmitted and received at a receiver side, the sampled signal can successfully be reproduced without any loss of its information through resampling when the entire system of signal transmission including the transmitter and the receiver satisfies the Nyquist conditions for transmission without waveform distortion. If the transmission system does not satisfy the Nyquist conditions, reproduction of the original signal will hardly be accomplished although the resampling is done at correct timings. Also, if the timing for resampling fails to be identical to that of the transmitter side, reproduction of the signal will be unsuccessful although the transmission system satisfies the Nyquist conditions. A resultant artifact will appear as ringing effects on a screen of the high-definition TV system, causing a more critical deterioration in the picture quality than that of the existing TV systems.

For satisfying the Nyquist conditions with higher consistency, waveform equalization of the received signal is requested at the receiver side. Generally, the television signal carries a reference signal superimposed in its vertical blanking periods for identifying the transmission characteristics. In the MUSE system, the reference signal is a VIT (vertical interval test) signal, or a single impulse of 32 MHz. The waveform equalization produces a filter characteristics corresponding to a reverse of the transmission characteristics which are identified using the reference signal. Two major methods of the waveform equalization respectively employ sampling rates equal to and twice the frequency of the signal. The former is shown, for example, in "An adaptive equalizer for an HDTV Receiver" by Nakamura et al, 1989 Spring National Conference, B-584, Institute of Electronics and Communication Engineers of Japan, and the latter includes WAVEFORM EQUALIZER IN MUSE Decoder by Iwadate et al, 1988 National Conference, 16-5, Institute of Television Engineers of Japan and "A waveform equalizer for the MUSE transmission system" by Noboru Kojima et al, IEEE, Transactions on Consumer Electronics, Vol. 36, No. 3, August 1990. Nakamura offers wave-form equalization through resampling at 16 MHz which is equal to the frequency of a TV signal. When the Nyquist conditions for transmission without waveform distortion are satisfied in transmission of sampled data of the TV signal, a VIT signal of the sampled data received at the receiver side will be in the same form of a single-impulse as that at the transmission side. If the Nyquist conditions fail to be satisfied, undesired signals, other than the peak value of each single impulse, are extracted. Those appear as waveform distortions. It is now understood that the train of impulses represents the transmission characteristics.

For correcting such an impulse train back to the original single impulse, the tap coefficients of a transversal filter are corrected one by one in the time domain according to a particular algorithm such as the MSE (mean square error) or ZF (zero forcing) schemes. Generally, the tap coefficients are modified tens of times until they become desired values for elimination of the waveform distortions caused during transmission.

According to the latter technique involving the resampling at 32 MHz, or twice the frequency of the TV signal, the transversal filter is determined to minimize a difference between the received VIT signal at 32 MHz and its ideal shape.

The reproduction of a clock signal for determining the timing for resampling is carried out using a phase locked loop (PLL) circuit in which a phase difference of the horizontal synchronizing signal of the TV signal can be minimized. More specifically, a voltage representing a phase error detected by a phase comparator circuit is converted by a digital-to-analog converting circuit (referred to as a D/A converter circuit hereinafter) to its analog form which is then fed to a loop filter. The output of the loop filter shifts a frequency of oscillation of a voltage controlled oscillator (referred to as a VCO hereinafter) to attenuate the phase error. As a result, the clock signal for synchronizing the horizontal synchronizing signal of the TV signal is generated and is used for determining the timing for resampling.

Figure 3:
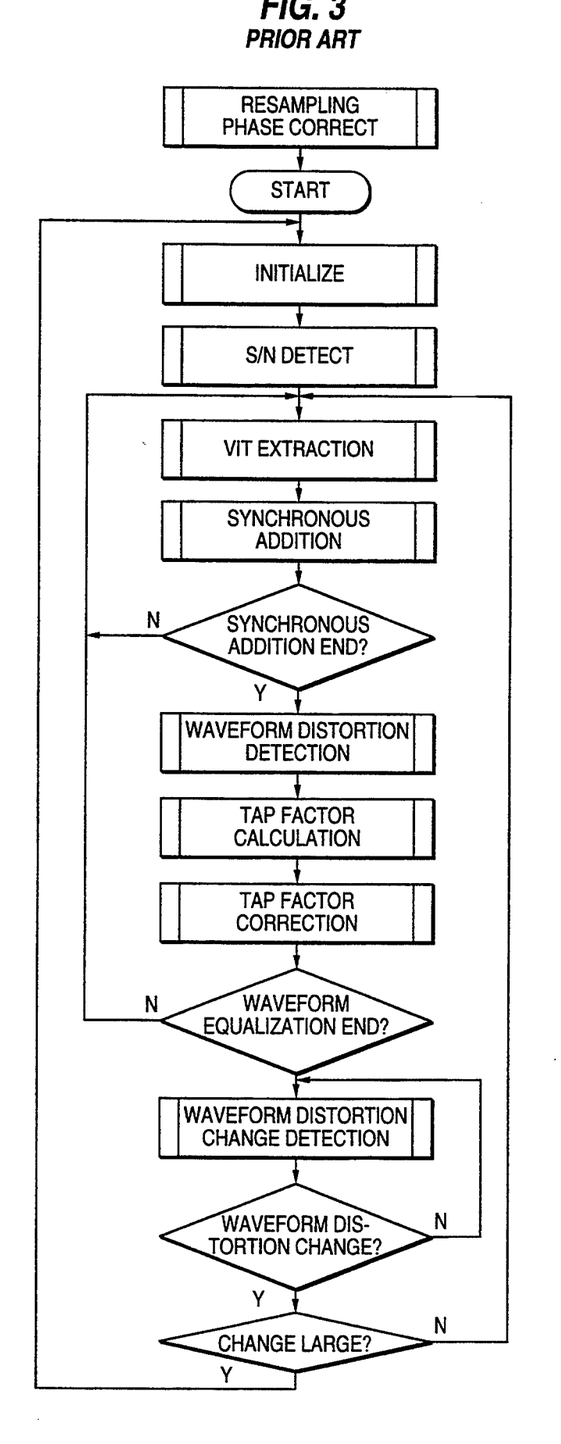
FIG. 3 is a flowchart showing a process of waveform equalization of the prior art.

FIG. 3 is a flowchart showing a known process of the waveform equalization. In the known waveform equalization, the generation of the clock signal is conducted independently of the waveform equalization. The received TV signal is fed to the transversal filter at the timing controlled by the clock signal from the clock circuit. This will not imply that the timing for resampling is optimum to the waveform equalization. While the clock signal for resampling is being shifted in phase by application of correction data from the outside to the PLL circuit, the waveform equalization is inhibited until the phase correction is completed, thus increasing the entire processing time. In the waveform equalization, the signal-to-noise (S/N) ratio has to be improved by repeating the addition of the reference signals in the TV signal at equal intervals of time (as will be referred to as synchronous addition hereinafter). If the received TV signal contains noise of considerable levels which have not been attenuated, its waveform will hardly be distinguished from the original shape, thus degrading the waveform equalization and, if worse, diverging the transmission system. For performing the waveform equalization in a sequence of the time domain, the synchronous addition is needed upon every correction of the tap coefficients of the transversal filter, thus increasing the overall time needed for the waveform equalization.

SUMMARY OF THE INVENTION

It is an object of the present invention to reduce the time needed for waveform equalizing of a television signal transmitted in the form of sampled values and to improve the operational stability of a system and the quality of waveform equalization.

To achieve the foregoing object, a reference signal superimposed on the television signal is fed through a second memory to a central processing unit (referred to as a CPU hereinafter) and processed by synchronous addition into a training signal. The training signal is then transferred to a first memory for storage and when requested, supplied alternatively to the television signal to a transversal filter. The input and output training signals of the transmission filter are fed through the second memory to the CPU for waveform equalization. The CPU extracts a resampled phase value from the reference signal during the production of the training signal, compares the resampled phase value with an ideal reference phase value to produce a phase difference, and sends a control voltage representing the phase difference to a PLL circuit which reproduces a clock signal from the television signal. Accordingly, the clock signal will be specified to produce optimum resampling phase matching in the waveform equalization.

DESCRIPTION OF THE PREFERRED EMBODIMENTS

Figure 1:
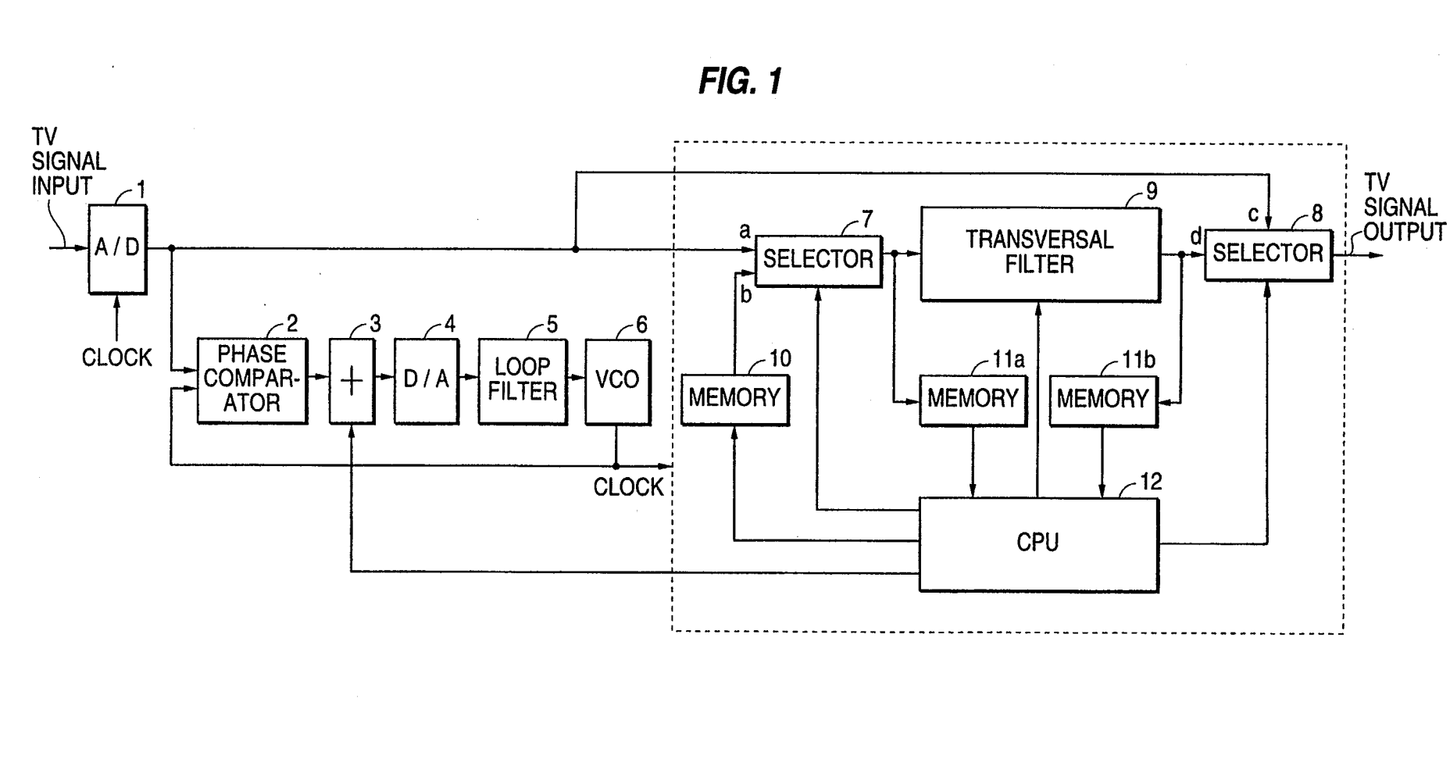
FIG. 1 is a basic circuit diagram of a waveform equalizing system according to the present invention.

FIG. 1 is illustrates a circuit diagram of a waveform equalizing system of the present invention, which comprises an A/D converter 1, a phase comparator 2, an adder 3, a D/A converter 4, a loop filter 5, a voltage controlled oscillator circuit 6, a first selector circuit 7, a second selector circuit 8, a transversal filter 9, a first memory 10, two second memories 11a and 11b, and a CPU 12. An input television signal is quantized by the A/D converter 1 and transmitred to the phase comparator circuit 2. The phase comparator circuit 2 detects a phase difference or delay between a horizontal synchronizing signal of the input TV signal and an output of the voltage controlled oscillator circuit 6 and delivers its corresponding voltage to the adder 3. At the adder 3, the phase different voltage is added to a phase control signal fed from the CPU 12 which is adapted to is converted by the D/A converter 4 to its analog equivalent which is then transmitted through the loop filter 5 to the voltage controlled oscillator circuit 6 for controlling the frequency of oscillation. The output of the voltage controlled oscillator circuit 6 is a reproduced clock signal and is supplied to the A/D converter 1. Also, the television signal, after being quantized, is fed to the first selector circuit 7. The CPU 12 controls the first selector circuit 7 to open the "a" position to pass the TV signal to the transversal filter 9. Then, the CPU 12 extracts VIT components of the TV signal at both input and output ends of the transversal filter 9 and takes them through the two memories 11a, 11b respectively for synchronous addition. Through repeating this action accompanied by the synchronous addition, the S/N ratio will be improved.

Figures 4A, 4B:
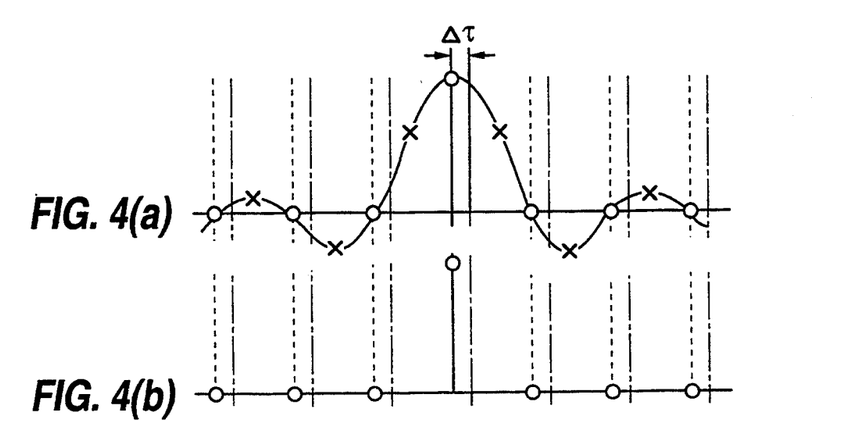
FIG. 4(a) is a signal waveform diagram explaining the resampling of an ideal VIT signal.
FIG. 4(b) is a waveform diagram of a reproduced form of the VIT signal resampled in correct phase.
Figure 4C:
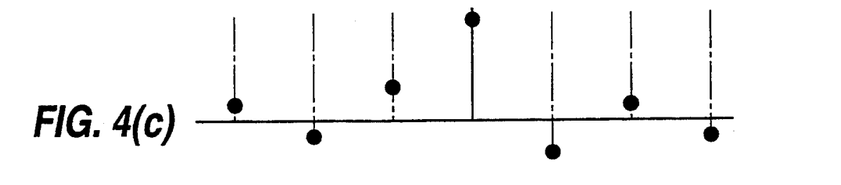
FIG. 4(c) is a waveform diagram of a reproduced form of the VIT signal resampled in deviated phase.

It is now assumed that the resampling is conducted with a phase difference $\Delta\tau$ from the ideal resampling timing as shown in FIGS. 4(a) to 4(c). FIG. 4(a) illustrates the resampling of an ideal VIT signal, FIG. 4(b) shows a reproduction of the VIT signal through correct phase resampling, and FIG. 4(c) shows a phase deviated reproduction of the VIT signal created by erroneous resampling. Hence, the VIT signal extracted and subjected to synchronous addition by the CPU 12 has a waveform as shown in FIG. 4(c). For example, it is assumed that the phase control signal supplied from the CPU 12 to the adder 3 is data having a specified number of bits (e.g. a 4-bit signal), and a phase difference corresponding to one LSB (least significant bit) of the control signal, which is 1.5 nsec. The CPU 12 is provided with a table containing the values of theoretical VIT signals having phase differences in manosecond units 1.5 and performs a correlation calculation from the theoretical values in the table and the values of the actually retrieved VIT signal. In the correlation calculation, local peaks in several cycles near the peak of the VIT signal are also involved for minimizing a calculation error resulting from noise at a low S/N ratio. A theoretical VIT signal which exhibits the largest correlative effect will be designated as the best match to the actual VIT signal, considering that its phase difference represents a phase distortion of the resampled signal. Accordingly, a reverse of the phase difference (the same in absolute value as and opposite in sign to the phase difference) is fed as the phase control signal to the adder 3.

As the transmission characteristics are identified from the reference signal in the TV signal, optimum resampling in the waveform equalization can be achieved by controlling the timing of resampling with the reference signal. Also, the use of the reference signal for the waveform equalization allows the synchronous addition to be assigned for common use. Accordingly, the overall time needed for the waveform equalization will be reduced as compared with a separate control over the timing for resampling.

Figure 2:
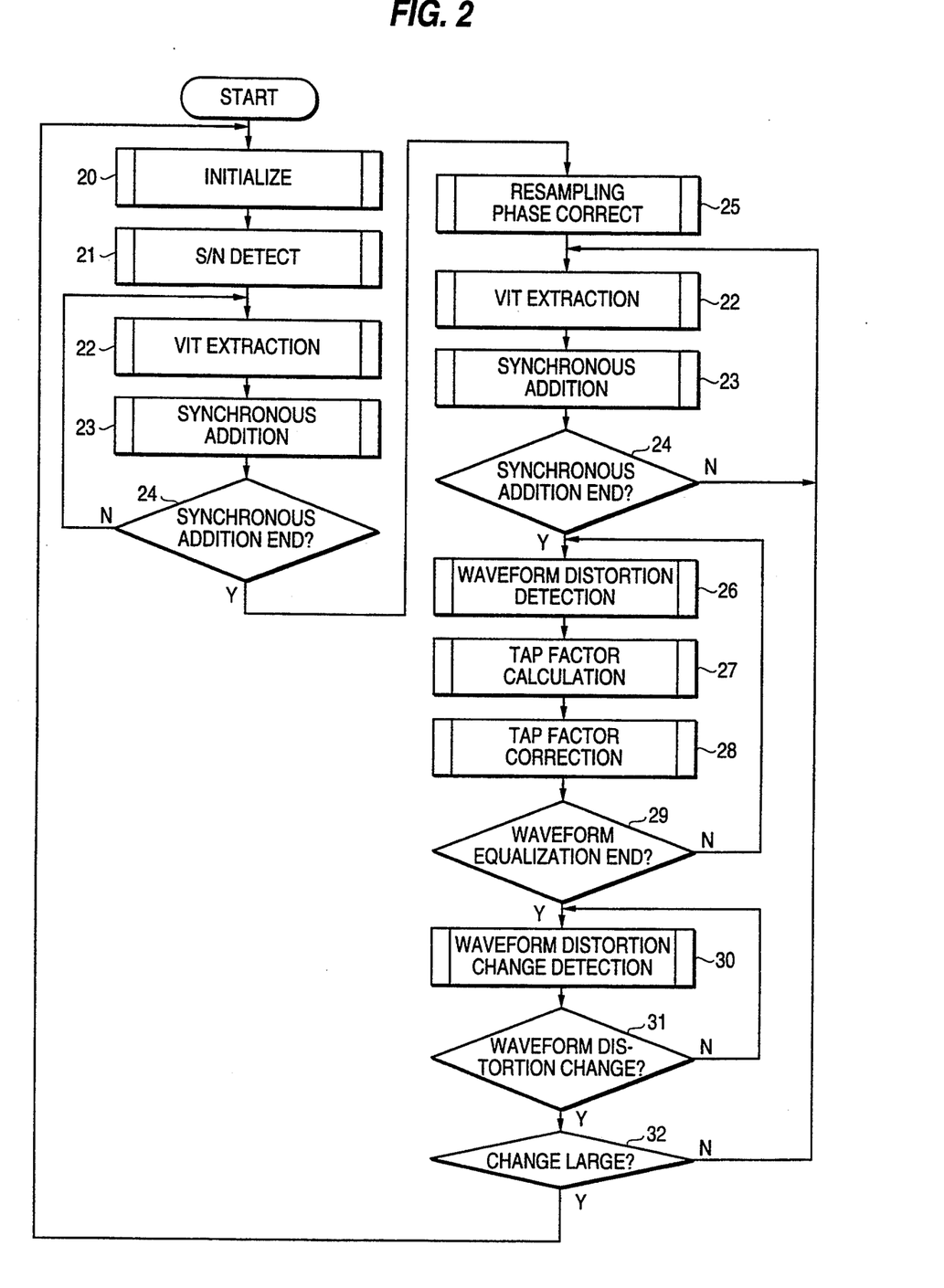
FIG. 2 is a flowchart showing a process of waveform equalization of the present invention.

FIG. 2 is a flowchart showing a process of the waveform equalization. After initialization (Step 20) and S/N detection (Step 21), the VIT signal is extracted (Step 22) and processed by synchronous addition (Step 23) before moving to Step 25 because both steps are essential for both the waveform equalization and the resampling phase correction. Immediately after Step 25 for resampling phase correction has been completed, Steps 22 and 23 for VIT signal extraction and synchronous addition are repeated. This repetitive action is accomplished by adding a new VIT signal to the resultant sum signal produced at Step 25. At the time when the synchronous addition is completed, the VIT signal is transferred by the CPU 12 to the memory 10 where it is stored as a training signal. The selector circuit 7 is then switched to the "b" position for feeding the training signal of the memory 10 to the transversal filter 9. The CPU 12 extracts the training signals at the input and output of the transversal filter 9 through the respective memories 11a and 11b and compares them with the ideal reference signal form to produce differences which represent waveform distortions (Step 26).

Using the MSE or ZF algorithm, the tap coefficients of the transversal filter 9 are then calculated for attenuating the waveform distortions to zero (Step 27). The existing tap coefficients of the transversal filter 9 then replaced by the desired values (Step 28). The two steps 26 and 27 are repeated until the waveform distortions are completely eliminated. A series of Steps 26, 27, and 28 for the waveform distortion detection, the tap coefficient calculation, and the tap coefficient correction can be conducted without involvement of previous Steps 22 and 23 of the VIT signal. extraction and the synchronous addition. Hence, the time consumption of this part of the sequence will be decreased considerably.

After the waveform equalization is completed, the CPU 12 turns the selector circuit 7 from the "b" position to the "a" position and also turns the selector circuit 8 from the "c" position to the "d" position for delivering a corrected waveform of the TV signal. Also, the waveform distortions of the TV signal are compared by the CPU 12 before and after the waveform equalization to examine a change thereof (Step 30). If the change in the waveform distortion is found (Step 31) and its value is small (Step 32), the procedure starts again after Step 25 of the resampling phase correction. The procedure can however be minimized in time consumption similarly and thus, the traceability to waveform distortion change will be increased. In another respect, the waveform equalization with the training signal is done in a closed loop. Accordingly, it can be conducted without being disturbed by a succeeding input of the TV signal and will thus remain stable and free from interference.

Figure 5:
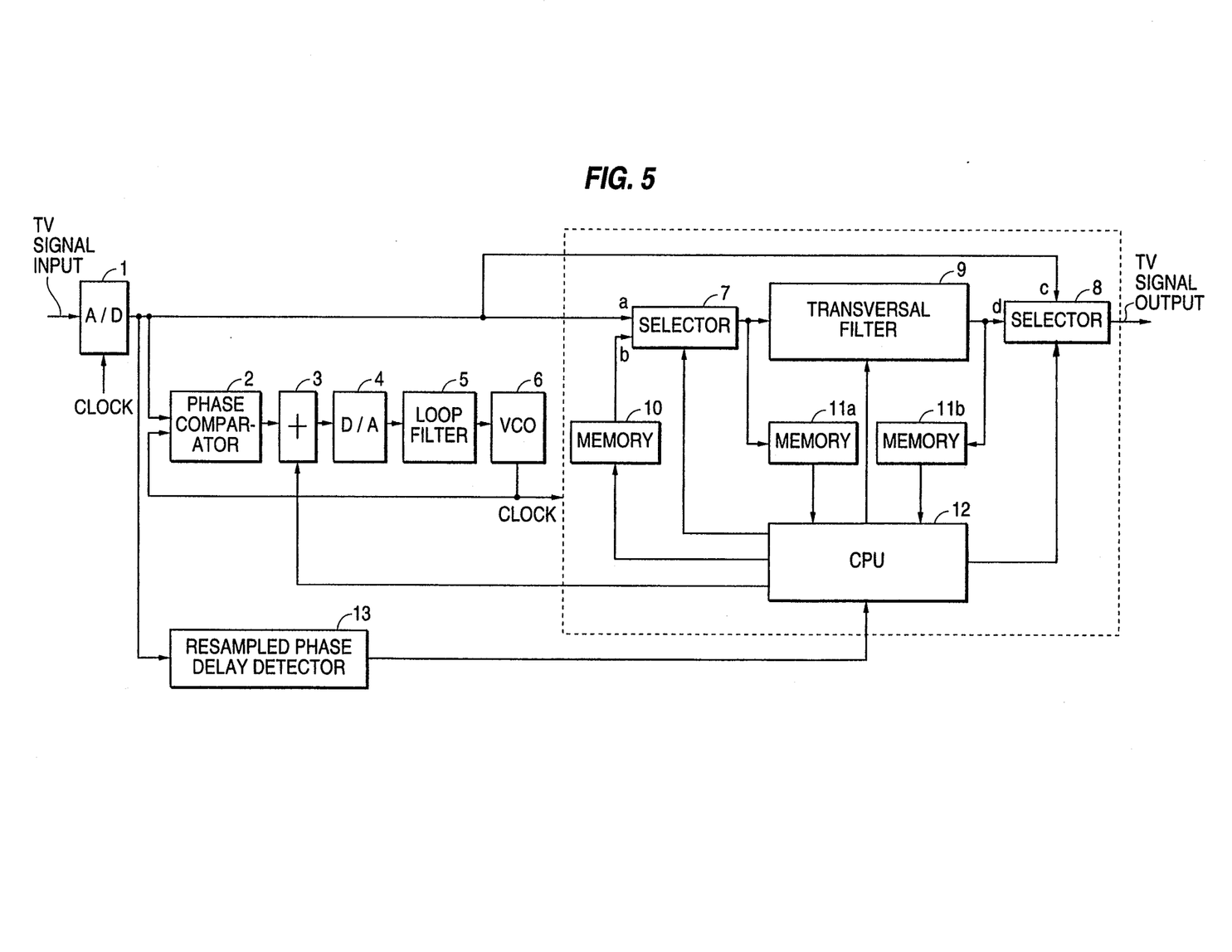
FIG. 5 is a circuit diagram of another waveform equalizing system according to the present invention.

FIG. 5 is a circuit diagram of another waveform equalizing system according to the present invention. Common components will be not be explained in detail. The input TV signal is fed for generation of the clock signal to the PLL circuit which comprises a phase comparator circuit 2, an adder 3, a D/A converter 4, a loop filter 5, and a voltage controlled oscillator 6. The CPU 12 calculates several VIT signals which are lag in phase by several given values of $\Delta \tau$ from the ideal VIT signal and sends them to a resampled phase delay detector circuit 13. The resampled phase delay detector circuit 13 then examines the correlation between the input TV signal and the VIT signal having a phase delay and fed from the CPU 12 and transfers back its result to the CPU 12. The correlation is examined on the plurality of VIT signals. If the correlation is greater than a predetermined threshold value, it is judged that the VIT signal is deviated by $\Delta \tau$ in the phase at resampling, In consequence, a reverse of the characteristic of the VIT signal is assigned to the tap coefficient of the transversal filter 9. Then, the waveform equalization is carried out to eliminate waveform distortions derived from sources other than the resampled phase delay. As the waveform equalization is performed after the elimination of waveform distortions caused by the resampled phase delay, the time needed for convergence will be shortened.

Figure 6:
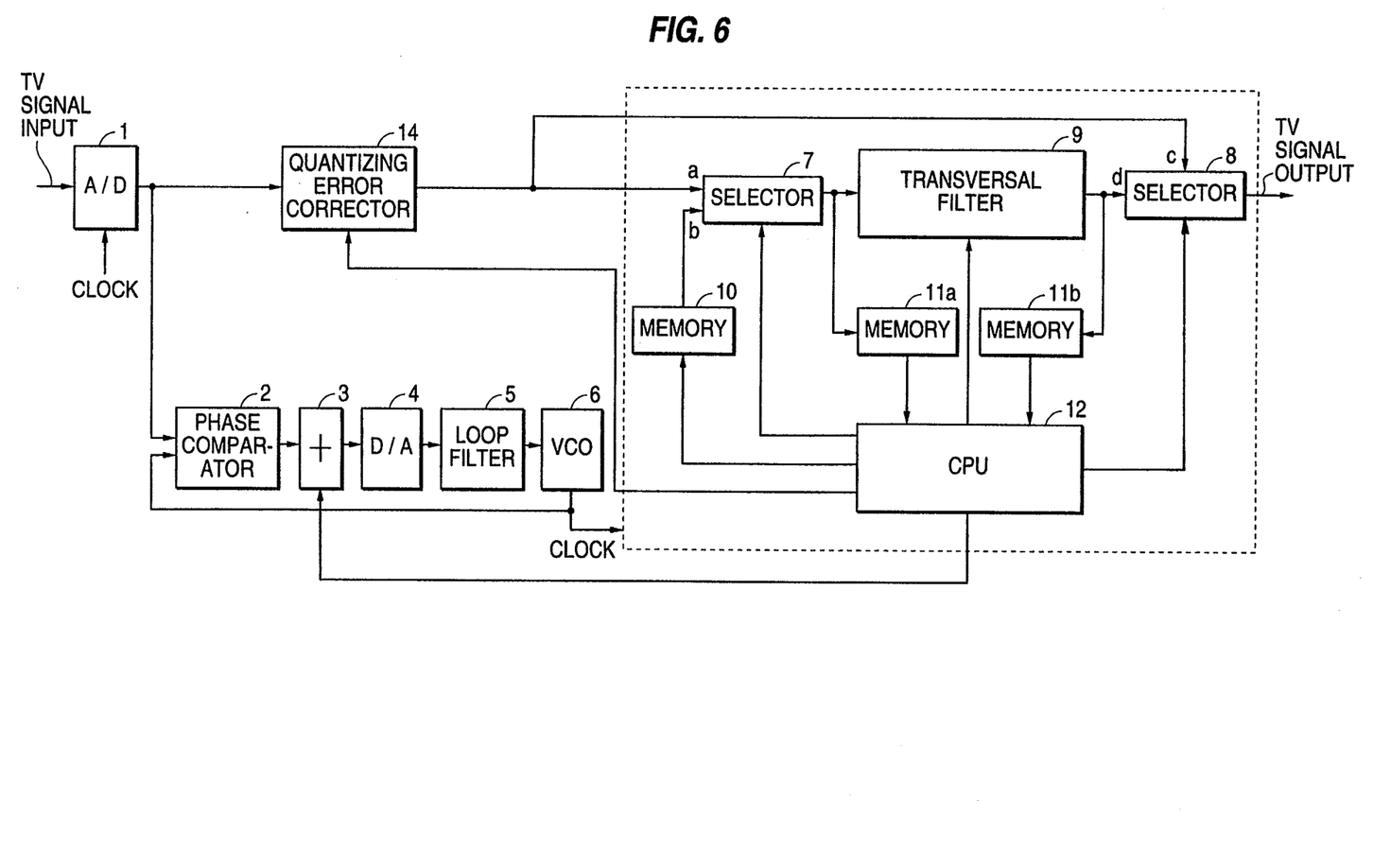
FIG. 6 is a circuit diagram of a further waveform equalizing system according to the present invention.

FIG. 6 is a circuit diagram of a further waveform equalizing system according to the present invention. common components will not be explained in detail. An A/D converter 1 is provided for quantizing the clamp level component of the input TV signal to a given value. The clamp level components of the TV signal are fed through second memories 11a and 11b to a CPU 12 where they are compared with reference values. If the clamp level is different from the reference value, it is judged that the A/D converter 1 has produced a quantizing error. The CPU 12 then instructs a quantizing error correcting circuit 14 to correct the quantizing error. Then, the waveform equalization is carried out. No quantizing errors are involved after the quantizing error correction and the waveform equalization may thus be performed to eliminate inherent waveform distortions.

Figure 7:
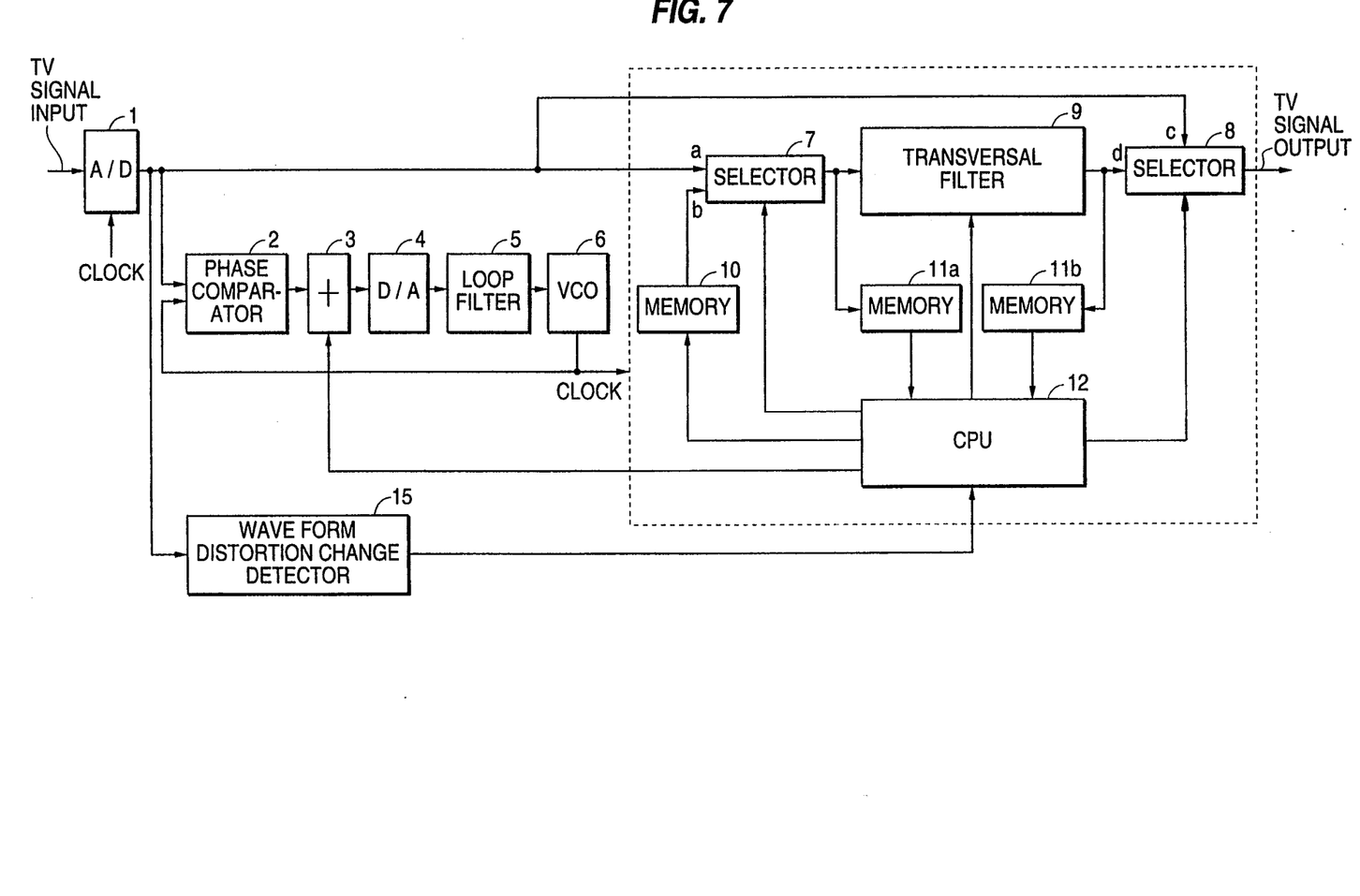
FIG. 7 is a circuit diagram of a still further waveform equalizing system according to the present invention.

FIG. 7 is a circuit diagram of a still further waveform equalizing system according to the present invention. Also, common components will not be explained in detail. A means for detecting a change in the input TV signal is not provided because the TV signal is not fed to the CPU 12 during action of the waveform equalization with the training signal supplied via the "b" position of the selector circuit 7 from the memory 10. In particular, a waveform distortion change detector circuit 15 is provided for operating independently of the waveform equalization to examine whether the waveform distortion is varied or not due to a change in the TV signal. When the waveform distortion change detector circuit 15 determines that there is no change in the waveform distortion at the end of the waveform equalization, the CPU 12 switches the selector circuit 7 from the "b" position to the "a" position and also, another selector circuit 8 from the "c" position to the "d" position for delivery of a waveform equalized version of the TV signal. This system will allow the waveform equalized signal to be passed steadily without being affected by any change in the waveform distortion.

If the input TV signal varies significantly after completion of the waveform equalization, it should be corrected by starting again the same process from initialization of the transversal filter. If its change is small, the waveform equalization may be continued to a cycle. However, the signal processing becomes in both cases, thus producing a TV signal error for an instant. For compensation, a modified arrangement of the CPU 12 contains software or a program of a digital filter equivalent to the transversal filter so as to carry out the waveform equalization without affecting the transversal filter 9. After completion of the waveform equalization by the equivalent digital filter, the characteristics of the transversal filter 9 are corrected. As the result, such a TV signal error will be prevented.

It is preferable to examine whether or not each resampled phase delay which has been detected is true. The examination can be made by comparing the phase of the present VIT signal with those of at least two, preceding and succeeding, VIT signals. The two other VIT signals have to be extracted in the same manner as of the present VIT component. Therefore, the CPU 12 is provided with a set of impulse responses of their respective resampled phase values and performs another resampling phase correction through multiplying the resampled phase by its preceding and succeeding impulse responses. Accordingly, the examination for the resampled phase delay will be done without extracting the comparative VIT signals.

What is claimed is:

1. A waveform equalizing system for waveform equalizing a television signal transmitted in the form of sampled values comprising:
   a clock reproducing phase locked loop circuit for reproducing a clock signal from the television signal;

a transversal filter;

a first selector circuit for alternatively passing the television signal or an output of a first memory to the transversal filter;

a central processing unit for extracting reference signals contained in the television signal from the input and output of the transversal filter through two second memories respectively and performing a synchronous addition of the extracted reference signals;

the first memory for storing a reference signal processed by the synchronous addition in the central processing unit; and a second selector circuit for alternatively delivering the television signal or an output of the transversal filter in response to a control signal from the central processing unit;

said central processing unit being arranged for calculating a phase difference between the clock signal of the clock reproducing phase locked loop circuit and the reference signal processed by the synchronous addition and controlling clock signal phase of the clock reproducing phase locked loop circuit to correct the phase difference.

2. A waveform equalizing system for waveform equalizing a television signal transmitted in the form of sampled values comprising:

a transversal filter;

a first selector circuit for alternatively passing the television signal or the output of a first memory to the transversal filter;

a central processing unit for extracting reference signals contained in the television signal from the input and output of the transversal filter through two second memories respectively and performing a synchronous addition of the extracted reference signals;

the first memory for storing a processed reference signal processed by the synchronous addition in the central processing unit;

a second selector circuit for alternatively delivering the television signal or an output of the transversal filter in response to a control signal from the central processing unit; and a resampling phase difference detecting circuit for receiving the television signal and the processed reference signal and for detecting a resampling phase error from the processed reference signal;

said resampling phase difference detecting circuit being arranged for transferring the resampling phase error to the central processing unit which then determines tap coefficients of the transversal filter for elimination of the resampling phase error prior to waveform equalization.

3. A waveform equalizing system for waveform equalizing a television signal transmitted in the form of sampled values comprising:

a transversal filter;

a quantizing error correcting circuit for correcting a quantizing error of the television signal to obtain a quantizing error corrected television signal;

a first selector circuit for alternatively passing the quantizing error corrected television signal or an output of a first memory to the transversal filter;

a central processing unit for extracting reference signals contained in the quantizing error corrected television signal from the input and output of the transversal filter through two second memories respectively and performing a synchronous addition of the extracted reference signals;

the first memory for storing a reference signal processed by the synchronous addition in the central processing unit;

a second selector circuit for alternatively delivering the quantizing error corrected television signal or an output of the transversal filter in response to a control signal from the central processing unit; and said central processing unit being arranged for calculating a value of the quantizing error from a clamp level of the television signal and for controlling the quantizing error correcting circuit using the calculated value.

4. A waveform equalizing system for waveform equalizing a television signal transmitted in the form of sampled values comprising:

a quantizing circuit for quantizing an input analog television signal to obtain a quantized television signal;

a clock reproducing phase locked loop circuit for reproducing a clock signal from the quantized television signal, the clock signal being fed to the quantizing circuit for operating said quantizing circuit;

a transversal filter;

a first selector circuit for alternatively passing the quantized television signal or an output of a first memory to the transversal filter; p1 a central processing unit for extracting reference signals contained in the quantized television signal from the input and output of the transversal filter through two second memories respectively and for performing a synchronous addition of the extracted reference signals;

the first memory for storing a reference signal processed by the synchronous addition in the central processing unit; and a second selector circuit for alternatively delivering the quantized television signal or an output of the transversal filter in response to a control signal from the central processing unit;

said central processing unit being arranged for holding a train of impulse responses involved when controlling the clock reproducing phase locked loop circuit and for calculating waveform equalized outputs before and after a resampled phase from the impulse responses.

5. A waveform equalizing system for waveform equalizing a television signal transmitted in the form of sampled values comprising:

a transversal filter;

a first selector circuit for alternatively passing the television signal or an output of a first memory to the transversal filter;

a central processing unit for extracting reference signals contained in the television signal from the input and output of the transversal filter through two second memories respectively and performing a synchronous addition of the extracted reference signals;

the first memory for storing a reference signal processed by the synchronous addition in the central processing unit;

a waveform distortion change detecting circuit for detecting a waveform change of the television signal; and a second selector circuit for alternatively delivering the television signal or an output of the transversal filter in response to a control signal from the central processing unit;

said central processing unit containing an equivalent digital filter to the transversal filter which is programmed from the output of the first memory and using the equivalent digital filter for performing the waveform equalization when the waveform change in the television signal is detected by the waveform distortion change detecting circuit.

* * * * *